(12) United States Patent
Hardwicke et al.

(10) Patent No.: US 7,004,622 B2
(45) Date of Patent: Feb. 28, 2006

(54) SYSTEMS AND METHODS FOR DETERMINING CONDITIONS OF ARTICLES AND METHODS OF MAKING SUCH SYSTEMS

(75) Inventors: Canan Uslu Hardwicke, Niskayuna, NY (US); John William Devitt, Mason, OH (US); Melvin Robert Jackson, Niskayuna, NY (US); Yuk-Chiu Lau, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/065,816

(22) Filed: Nov. 22, 2002

(65) Prior Publication Data

US 2004/0101022 A1    May 27, 2004

(51) Int. Cl.
*G01K 1/16*  (2006.01)
*G01K 13/08*  (2006.01)
*G01K 7/16*  (2006.01)
*G01K 7/02*  (2006.01)

(52) U.S. Cl. ............ 374/141; 374/153; 374/152; 374/179

(58) Field of Classification Search ............ 374/141, 374/152, 183, 179, 163, 180, 46, 45, 49, 374/187; 136/230; 73/862.04
See application file for complete search history.

(56) References Cited

U.S. PATENT DOCUMENTS

| | | | | |
|---|---|---|---|---|
| 275,670 A | * | 1/1883 | Kendall | 136/236.1 |
| 3,758,830 A | * | 9/1973 | Jackson | 317/234 R |
| 3,890,456 A | * | 6/1975 | Dils | 428/216 |
| 4,006,414 A | * | 2/1977 | Parker | 324/96 |
| 4,104,605 A | * | 8/1978 | Boudreaux et al. | 338/2 |
| 4,402,447 A | * | 9/1983 | Przybyszewski et al. | 228/103 |
| 4,464,419 A | * | 8/1984 | Horn | 427/58 |
| 4,786,887 A | * | 11/1988 | Bringmann et al. | 338/2 |
| 4,851,300 A | * | 7/1989 | Przybyszewski | 428/623 |
| 4,969,956 A | | 11/1990 | Kreider et al. | |
| 5,011,543 A | * | 4/1991 | Yokoi | 136/211 |

(Continued)

FOREIGN PATENT DOCUMENTS

DE    3534712 A1 *   4/1987

(Continued)

OTHER PUBLICATIONS

Thin film temperature sensors for gas turbine engines: Problems and prospects. Article by Budhani et al. 1986.*

(Continued)

*Primary Examiner*—Gail Verbitsky
(74) *Attorney, Agent, or Firm*—Penny A. Clarke; Patrick K. Patnode

(57) ABSTRACT

A system for measuring a condition of a turbine engine component comprises an assemblage of at least a film comprising an electrically conducting material disposed on a film of an electrically non-conducting material, the assemblage being disposed on a surface of the turbine engine component without removing material from the turbine engine component to compensate for thickness of at least one of the films. The electrically non-conducting material has a thermal expansion coefficient such that each of the films remains adhered to adjacent films through at least one cycle of extreme operating temperature. In addition, communication links can be provided to transmit the measurement representing the condition of the turbine engine to a remote user.

17 Claims, 6 Drawing Sheets

U.S. PATENT DOCUMENTS

| | | | |
|---|---|---|---|
| 5,220,189 A * | 6/1993 | Higashi et al. | 257/467 |
| 5,411,600 A * | 5/1995 | Rimai et al. | 136/225 |
| 5,446,437 A * | 8/1995 | Bantien et al. | 338/25 |
| 5,474,619 A * | 12/1995 | Kreider | 136/239 |
| 5,912,759 A * | 6/1999 | Good et al. | 359/297 |
| 6,037,645 A * | 3/2000 | Kreider | 257/467 |
| 6,072,165 A | 6/2000 | Feldman | |
| 6,190,040 B1 * | 2/2001 | Renken et al. | 374/185 |
| 6,568,848 B1 * | 5/2003 | Chapman et al. | 374/155 |
| 6,649,994 B1 * | 11/2003 | Parsons | 257/470 |
| 2004/0086026 A1 * | 5/2004 | Miki et al. | 374/183 |

FOREIGN PATENT DOCUMENTS

| | | | |
|---|---|---|---|
| EP | 0908713 A1 * | 4/1999 | |
| JP | 62291073 A * | 12/1987 | |
| JP | 410034825 A * | 2/1998 | |

OTHER PUBLICATIONS

News Monitor, Measure High Temperature Changes in Microseconds, abstract by Kreider, no date.*

Residual Stresse in Coating of Turbine Blades Used in Power Plants. Stuhr et al. Switzerland, no date.*

J. Longtin et al., "Sensors for Harsh Environments by Direct Write Thermal Spray,:" IEEE Sensors Symposium, Jun. 2002.

W. Mathias et al., "Direct Writing Technology Applications Update," no date.

B.H. Billins et al. (ed.), "American Institute of Physics Handbook," pp. 4-136-4-141, McGraw-Hill Book Company, New York (1972).

F. Cardarelli, "Materials Handbook A Concise Desktop Reference," pp. 358-365, Springer-Verlag, London (2000).

* cited by examiner

Section A-A

Section B-B

SYSTEMS AND METHODS FOR DETERMINING CONDITIONS OF ARTICLES AND METHODS OF MAKING SUCH SYSTEMS

BACKGROUND OF INVENTION

The present invention relates to materials and systems for determining at least a condition of components used in a harsh environment, methods of making such systems, and methods for determining such a condition. In particular, the present invention relates to systems for measuring temperature and/or strain of a component used in a hot gas path of a turbine engine, methods of making such systems, and methods for determining temperature and/or strain of such a component.

The operating temperature of gas turbine engines has continually been increased in an attempt to increase their efficiency. Consequently, gas turbine engine components also are exposed to increasingly higher temperatures, which decrease the design margin for the superalloy used to make the engine components. The superalloy substrate of certain engine components, such as combustor or high-pressure fan blades, is typically protected with a thermal barrier coating (or "TBC") comprising at least a layer of a refractory or thermally insulating material such as yttria-stabilized zirconia (or "YSZ"), which is zirconia stabilized with, for example, about 6–8 percent by weight of yttria. The refractory material would generally be selected to have a low thermal conductivity such as about 1–3 W/(m)(K), thereby reducing heat transfer to and the temperature experienced by the superalloy substrate. A typical thermal barrier coating is a multilayer system comprising at least two layers. In addition to the refractory layer, a bondcoat is applied to the surface of the superalloy of the turbine component. This bondcoat typically comprises an MCrAlY or an MAl alloy wherein M is nickel, and/or cobalt, or PtN alloy. The purpose of the bondcoat is to provide a layer that adheres well to the underlying alloy, provides protection against oxidation of the alloy, and provides a good base for further coatings. An optional intermediate layer or interlayer is applied on the bondcoat. A suitable material for this interlayer is $Al_2O_3$. This material can be formed by oxidizing the surface of the bondcoat to form an oxide layer prior to the deposition of the TBC. The interlayer provides improved adhesion for the final thermal insulating YSZ coating and is not included for a thermal barrier property.

Despite great care taken during manufacture to ensure good adhesion of the thermal barrier coating to the underlying material of the turbine component, thermal cycling during use of such a component eventually leads to spalling of the coating. In addition, erosion of the thermal barrier coating is inevitable over an extended period of use. Such a spalling or erosion would eventually expose the underlying bond-coated superalloy to extreme temperatures that would lead to failure of the component. The engine component may be inspected frequently for such a spalling or erosion. However, an inspection entails taking the engine out of service with the attendant cost. Therefore, it is very desirable to know when the underlying superalloy begins to be exposed to extreme temperatures so that appropriate maintenance of the engine is conducted. Wire thermocouples have been embedded in grooves cut into the superalloy substrate and filled with a high-temperature dielectric material to provide temperature measurement. However, this type of thermocouple installation sacrifices component wall thickness and is typically labor intensive because the fabrication process must ensure that the dielectric material and the thermocouple wires remain adhered to the substrate in the long run. Thin-film thermocouples have been deposited on the surface of components used in high-temperature environments to measure the temperature thereof. They are thin enough so as not to significantly disturb the aerodynamics of the component and can rapidly respond to changes in temperature of the surrounding medium. However, these thin-film thermocouples have frequently spalled off because of poor compatibility with the underlying material and defects produced during processing and/or use of the component.

Therefore, there is a continued need to provide reliable systems and methods for measuring temperature of a material used in an environment near its design temperature limit. It is also very desirable to monitor the temperature of such a material from a remote location. Furthermore, it is also very desirable to alert the user when such material begins to experience a temperature outside its intended limit.

SUMMARY OF INVENTION

The present invention provides reliable systems and methods for determining a condition of a material used in a harsh environment, such as an extreme temperature or a corrosive environment.

In one aspect of the present invention, the condition is a temperature of the material.

In another aspect of the present invention, the condition is a strain of the material.

In still another aspect of the present invention, a film thermocouple is sandwiched between two layers of one or more dielectric materials and is disposed on a substrate, the temperature of which is to be measured. The dielectric materials have thermal expansion coefficients compatible with those of adjacent layers or films such that the dielectric materials adhere to the layers adjacent thereto through at least one cycle of extreme operating temperatures.

In another aspect of the present invention, a film thermocouple sandwiched between two layers of one or more dielectric materials is disposed between the metallic substrate and the bondcoat of a turbine engine component.

In still another aspect of the present invention, the measurement relating to the temperature of the metallic substrate of the gas turbine engine component is provided to a user at a remote location for monitoring of a condition of the component.

Other features and advantages of the present invention will be apparent from a perusal of the following detailed description of the invention and the accompanying drawings in which the same numerals refer to like elements.

DETAILED DESCRIPTION

The present invention provides reliable systems, methods of making such systems, and methods for determining a condition, such as temperature and/or strain, of a material used in a harsh environment, such as an extreme temperature or corrosive environment. In one embodiment, the present invention provides film thermocouples to measure temperatures of components used in the hot-gas path of a turbine engine.

In one embodiment, the film thermocouple provides data on the temperature experienced by the metallic alloy of a turbine engine component so that the user is ensured that the component is not used outside its design temperature limit for an extended period, and is advised when the component needs to be repaired or replaced. The film thermocouple system of the present invention is reliable in that the integrity of the present system is enhanced. A thermocouple system of the present invention comprises a base film of at least a dielectric material and a film thermocouple disposed thereon. The dielectric material of the base film has a thermal expansion coefficient that is compatible with that of the substrate on which it is disposed. By "compatible," it is meant that the deposited dielectric base film remains adhered to the substrate after at least a complete heating-cooling cycle between room temperature and the highest operating temperature of the turbine engine component. The applicants have found that the thermal strain that typically leads to non-adherence of a non-ductile dielectric on a substrate is of the order of 0.006. This strain is calculated from the difference in thermal expansion coefficients for the dielectric and the substrate multiplied by the total change in temperature in the heating-cooling cycle. Thermal expansion coefficients of Ni-based superalloys are typically 16 to $19 \times 10^{-6}/°$ C., and coefficients for some dielectrics are given in Table 1. If an allowable thermal strain is limited to 0.006, films of alumina 25–50 microns thick on a superalloy may survive cycling from room temperature to approximately 725° C., while similar films of MgO on a superalloy may survive cycling from room temperature to at least 1200° C.

Figure 1:
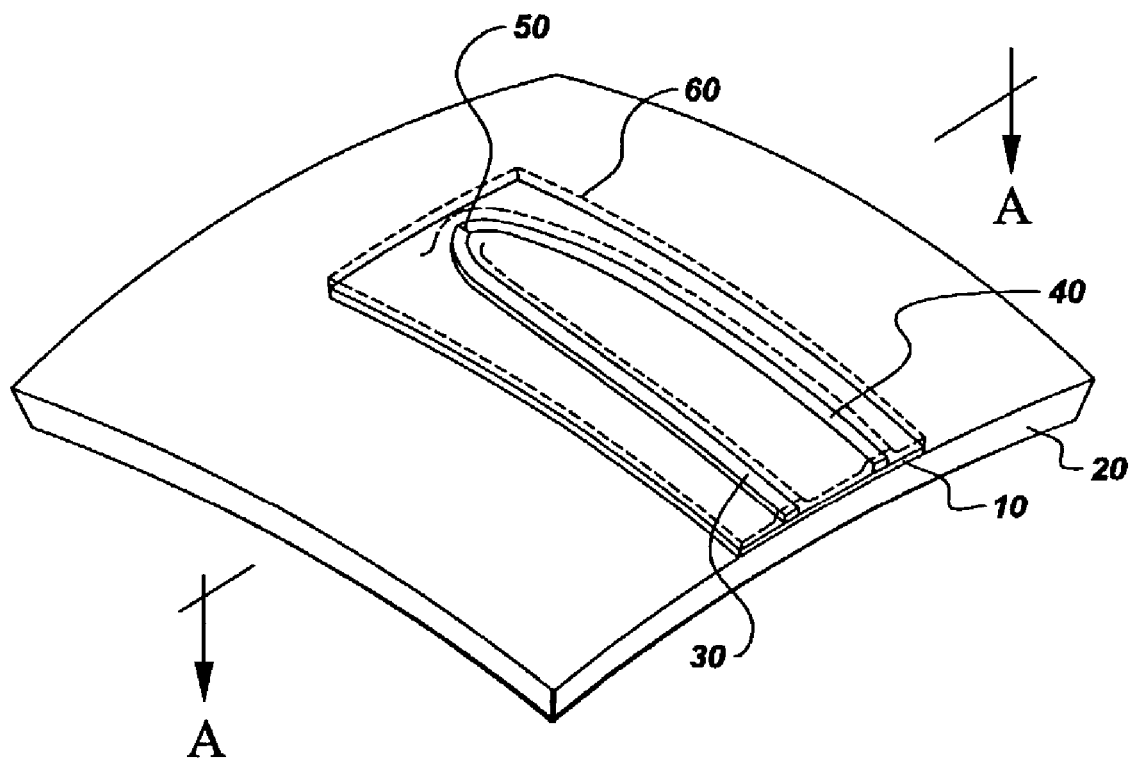
FIG. 1 shows a perspective view of a first embodiment of the film thermocouple of the present invention.
Figure 2:
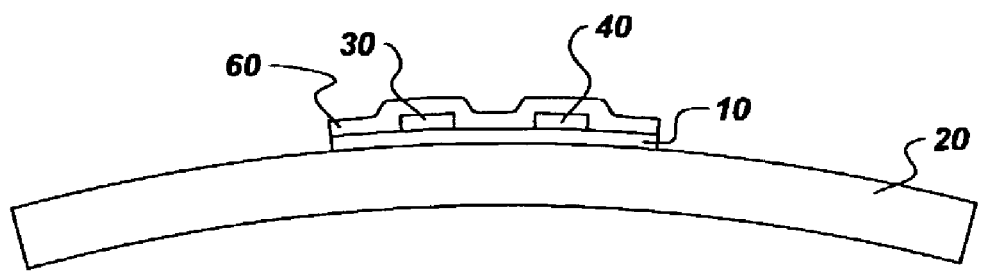
FIG. 2 shows a cross-sectional view of the film thermocouple of FIG. 1 along line A—A.

FIGS. 1 and 2 show the perspective and the cross-sectional view of the first embodiment of the invention. It should be understood that the figures are not drawn to scale. A base film 10 of a dielectric material is disposed on a portion of substrate 20. Wherever a dielectric material is mentioned herein, it can be substituted by an electrically insulating material. Preferably, base film 10 is disposed on a surface of substrate 20 without removing any material of substrate 20 to compensate for the thickness of base film 10 and any films disposed thereon. Thus, the mechanical strength of the substrate is substantially preserved. For example, no cuts or grooves are made in substrate 20 in order to embed the dielectric material and any other materials subsequently deposited thereon. The dielectric material has a thermal expansion coefficient that is compatible with that of the substrate over a wide range of operating temperature of the substrate. When the thermal expansion coefficient varies over this operating temperature range, the compatibility of thermal expansion coefficients is typically determined at about the highest operating temperature. Thermocouple films 30 and 40 of materials suitable for making a thermocouple are deposited on base film 10 to join at thermocouple junction 50. A protective dielectric film 60 is deposited on base film 10 and thermocouple films 30 and 40 to completely enclose films 30 and 40 between dielectric films 10 and 60. Thermocouple leads (not shown) are attached to thermocouple films 30 and 40 to provide a measurement of the temperature at junction 50.

Figure 9:
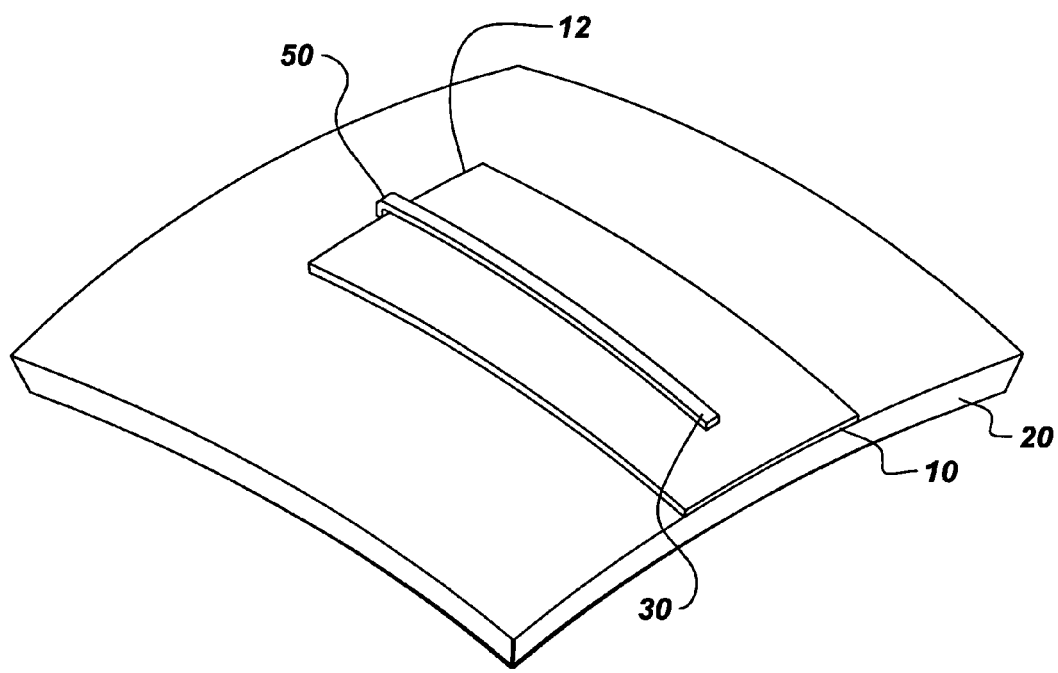
FIG. 9 shows a perspective view of an embodiment of the present invention wherein an electrically conducting film is extended beyond an edge of the base dielectric film to form a thermocouple junction with the base metal substrate.

Alternatively, the thermocouple can comprise a thermocouple film deposited on the base dielectric film and extending beyond an edge of the base dielectric film to form a thermocouple junction with the substrate when such substrate comprises an electrically conducting material. For example, FIG. 9 shows a perspective view of such an embodiment of the present invention. Base film 10 comprising a dielectric material is disposed on substrate 20. Thermocouple film 30 is disposed on base film 10 and extends beyond edge 12 of base film 10 to contact substrate 20 and forms thermocouple junction 50 with substrate 20.

In one embodiment of the present invention, substrate 20 is a turbine engine component and is made of a nickel-, nickel-iron-, or cobalt-based superalloy. Dielectric materials of base film 10 and protective film 60 can be the same or different materials and are selected from the group consisting of AlN, BN, MgO, $TiO_2$, $ZrO_2$, $La_2O_3$, $Cr_2O_3$, $ThO_2$, BeO, a mixture of NiO and $Al_2O_3$, and mixtures thereof. Thermal expansion coefficients of these materials at 1000° C. are shown in Table 1.

TABLE 1

| Material | Thermal Expansion Coefficient at 1000° C. $(10^{-6}/°\text{ C.})^{(1),(2)}$ | Electrical Resistivity $(\mu\text{ohm} \cdot \text{cm})^{(2)}$ | Melting Point (° C.) |
|---|---|---|---|
| AlN | 5.3 | $1 \times 10^{17}$ | 2230 |
| BN (hexagonal) | 7.5 | $1 \times 10^{19}$ | 2730 |
| MgO | 11.5–15.6 | $1.3 \times 10^{15}$ | 2852 |
| $TiO_2$ | 7.1–11.4 | $1 \times 10^{19}$ | 1855 |
| $ZrO_2$ (tetragonal) | 10–11 | $7.7 \times 10^7$ | 2710 |
| $La_2O_3$ | 11.9 | $1 \times 10^{14}$ | 2315 |
| $Cr_2O_3$ | 10.9 | $1.3 \times 10^9$ | 2330 |
| $ThO_2$ | 9.5–10.5 | $4 \times 10^{19}$ | 3390 |
| BeO | 7.5–11.3 | $1 \times 10^{22}$ | 2550 |
| NiO | 14.5 | Not available | not available |
| $Al_2O_3$ | 7.1–10.2 | $2 \times 10^{23}$ | 2054 |

(Sources of data:
(1)B. H. Billings et al. (ed.), "American Institute of Physics Handbook," Third Edition, Mc Graw-Hill Book Company, New York (1972);
(2)F. Cardarelli, "Material Handbook, A Concise Desktop Reference," Springer, London (2000).)

Each of films 10, 30, 40, and 60 typically has a thickness of about 5 to about 300 micrometers and is deposited on an underlying layer by the direct writing method. The total thickness of the entire system of these thin films is still low enough such that the fluid flow behavior around the component is not quantitatively affected. In this method, a dispersed powder mixture is delivered to and forced through a nozzle or pen at a controlled rate. The size of the nozzle or pen orifice may be chosen conveniently to provide a desired width of each pass of the deposition. The size can range from about 10 nanometers to about 250 micrometers. The nozzle can float on the substrate at a controlled distance (e.g., from about 0 to about 300 micrometers) therefrom. Therefore, a film having a substantially uniform thickness may be deposited rapidly and precisely on a substrate. The direct writing method avoids the use of masks that are required by other deposition methods, such as chemical vapor deposition, physical deposition, or sputtering. Examples of suitable apparatuses for direct writing of thin films are those made by OhmCraft and Sciperio. Film patterns, thicknesses, and other parameters are typically controlled by a computer operating a CAD/CAM program. The powder (having a size from a few nanometers to about 44 micrometers (325 mesh)) of a film material or its precursor is dispersed in a liquid solvent medium, such as an alcohol, which can optionally contain a surfactant to promote better wetting of the powder mixture on the substrate, or a rheology modifier to adjust the viscosity of the mixture. Typically, the mixture has a consistency similar to that of toothpaste. The mixture can also include, if desired, a material that can promote the conversion of a metallic ingredient to a compound thereof. A temporary binder, such as starch or cellulose, also can be added to the mixture to provide integrity to the deposited film before it is further treated. The powder, solvent, and optional surfactant and/or temporary binder can be mixed in any conventional mixer, such as a rotating canister, high-speed blender, ribbon blender, or shear mixer. After the dispersed powder mixture is deposited on the substrate, the powder is sintered to form a substantially continuous film by local annealing with laser or electron beam heating. Alternatively, the whole work piece may be annealed if the sintering temperature is below the softening point of the substrate. If powder of a precursor of a dielectric material is first deposited, it is typically converted into the dielectric material in the annealing step by using an appropriate atmosphere, such as an oxidizing atmosphere to produce an oxide dielectric material. Partial sintering of the thermocouple sensor film is also acceptable as long as the partially sintered film is electrically conductive.

Typically, for measurement of temperatures greater than about 900° C. in a chemically reactive environment, noble metal alloys are used as film material for thermocouples of the present invention. Suitable materials are alloys of Pt—Rh, Pt—Pd, Rh—Pd, Zr—Pt—Rh, Au—Pt—Rh, Ag—Pt—Rh, Zr—Pt—Pd, Au—Pt—Pd, Au—Cr—Ru—Ni, Au—Pt, Au—Pd, and W—Re. For measurement of temperatures up to about 1300° C., various nickel alloys may be used, such as Ni—Cr, Ni—Mn—Al, Mn—Ni, Ni—Cr—Si—Mg, Ni—Si—Mg, Ni—Co, and Ni—Mo. The thermal expansion coefficients of several of these alloys are shown in Table 2.

TABLE 2

| Material | Thermal Expansion Coefficient at 1000° C. (10$^{-6}$/° C.) |
|---|---|
| Pt | 9.1 |
| Pt-10% Rh | 10 |
| 90% Ni-9% Cr | 13.1 |
| 95% Ni-2% Mn-2% Al | 12 |
| 84.3% Ni-14% Cr-1.4% Si-0.1% Mg | 13.3 |
| 95.5% Ni-4.4% Si-0.1% Mg | 12.1 |
| Ni-1% Co | 13.6 |
| Ni-18% Mo | 11.9 |

Figure 3:
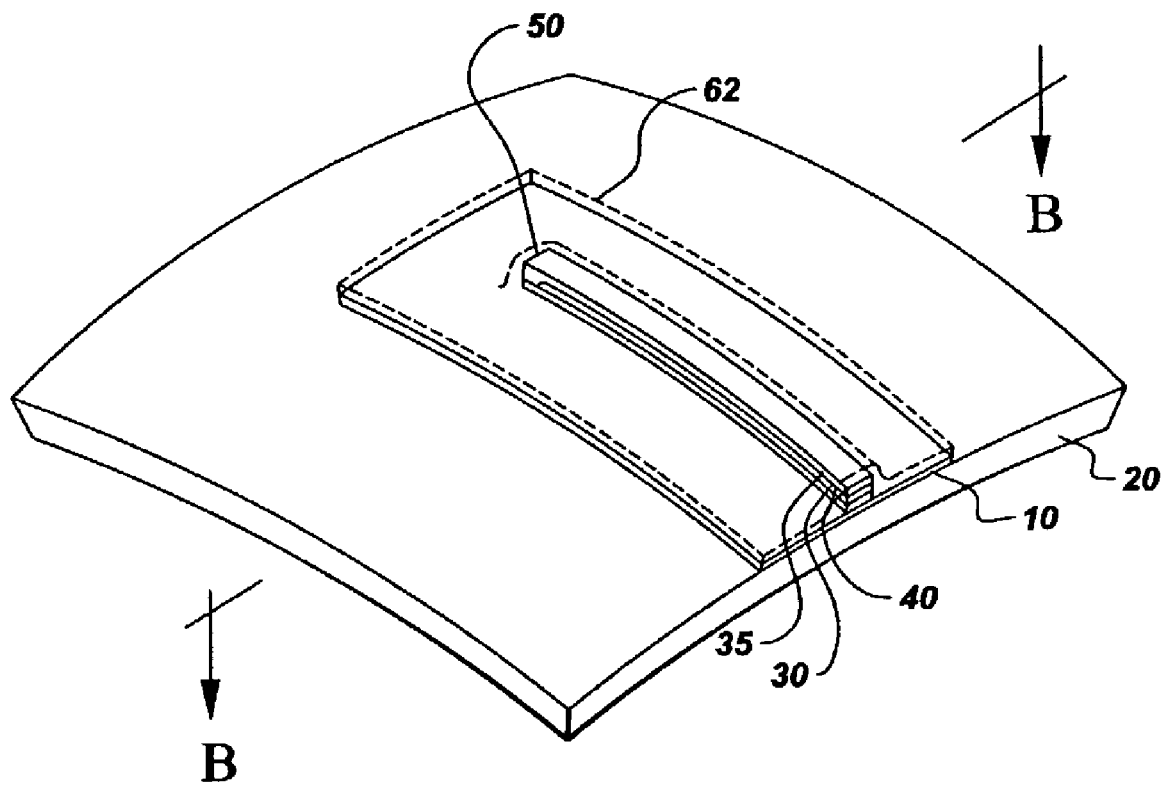
FIG. 3 shows a perspective view of a second embodiment of the film thermocouple of the present invention.
Figure 4:
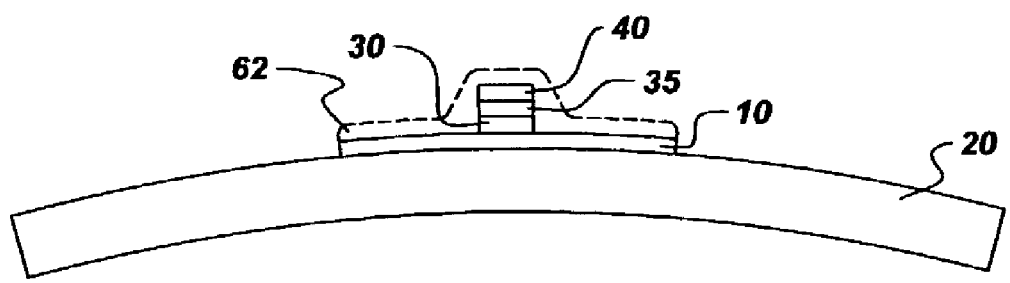
FIG. 4 shows a cross-sectional view of the film thermocouple of FIG. 3 along line B—B.

FIGS. 3 and 4 show the perspective and the cross-sectional view of the second embodiment of the invention. A base film 10 of a dielectric material is deposited on a portion of substrate 20. A first film 30 of a thermocouple or a strain gauge material is deposited on base dielectric film 10. A second dielectric film 35 is deposited on first thermocouple film 30. Dielectric film 35 may comprise a material similar to or different than that of base film 10 and covers the surface of first thermocouple film 30 except for a small portion of one end of film 30. A second thermocouple film 40 is deposited on second dielectric film 35 and joins first thermocouple film 30 at its exposed end to form thermocouple junction 50. A third dielectric film 62 is deposited on base film 10 and thermocouple film 40 to enclose the thermocouple between dielectric films 10 and 62. Thermocouple leads (not shown) are attached to thermocouple films 30 and 40 to provide a measurement of the temperature at junction 50.

In a situation in which a thermocouple film material is an alloy that forms a eutectic phase, a mixture comprising powders of individual metals may be deposited using the method of direct writing, as disclosed above, and the work piece is subsequently heated to the eutectic temperature to form the alloy.

In another embodiment of the present invention wherein substrate 20 is an electrically conducting material, one end of first film 30 of a thermocouple material extends beyond an edge of base film 10 to form thermocouple junction 50 with substrate 20. Thus substrate 20 acts as the second thermocouple material, and eliminates the need for second dielectric film 35 and second thermocouple film 40. Dielectric film 62 still desirably encloses film 30 and thermocouple junction 50.

Figure 5:
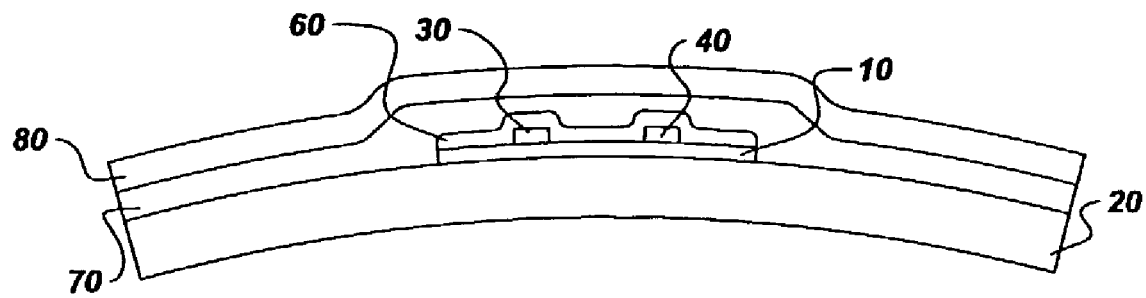
FIG. 5 shows a cross-sectional view of the film thermocouple of FIG. 2 embedded between a section of a turbine engine component substrate and a bondcoat.
Figure 6:
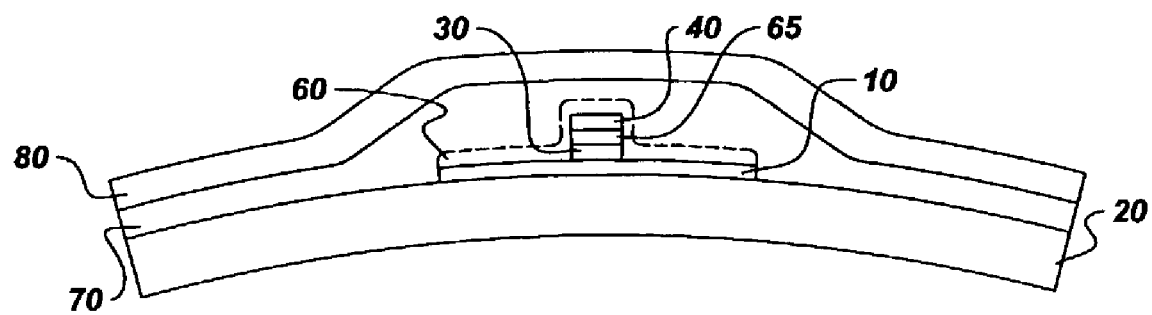
FIG. 6 shows a cross-sectional view of the film thermocouple of FIG. 3 embedded between a section of a turbine engine component substrate and a bondcoat.

In other embodiments of the present invention shown in FIGS. 5 and 6, substrate 20 is a turbine engine component comprising a superalloy, such as a nickel-, iron-nickel-, or cobalt-based superalloy. The assemblage of thermocouple films 30 and 40 sandwiched between dielectric films 10 and 60 is disposed on a surface of the turbine engine component. A bondcoat 70 comprising MCrAlY, wherein M is nickel and/or cobalt, or PtNi alloy, is disposed on superalloy substrate 20 to cover both the assemblage of thermocouple films sandwiched between dielectric films 10 and 60 and substrate 20. A thermal barrier coating 80, such as one comprising YSZ, is disposed on bondcoat 70. Thus, the thermocouple assemblage is embedded between superalloy substrate 20 and bondcoat 70. An upward trend in the temperature measured by the thermocouple would be an indication that either or both of the bondcoat and the thermal barrier coating may have eroded or an excursion in the operating temperature is occuring. Thus, the thermocouple of the present invention allows for a convenient and reliable monitoring of the condition of the turbine engine component without the need to interrupt the operation of the turbine engine. Thus, maintenance of the turbine engine components can be conducted efficiently when it is needed, and not according to a predetermined schedule.

Figure 7:
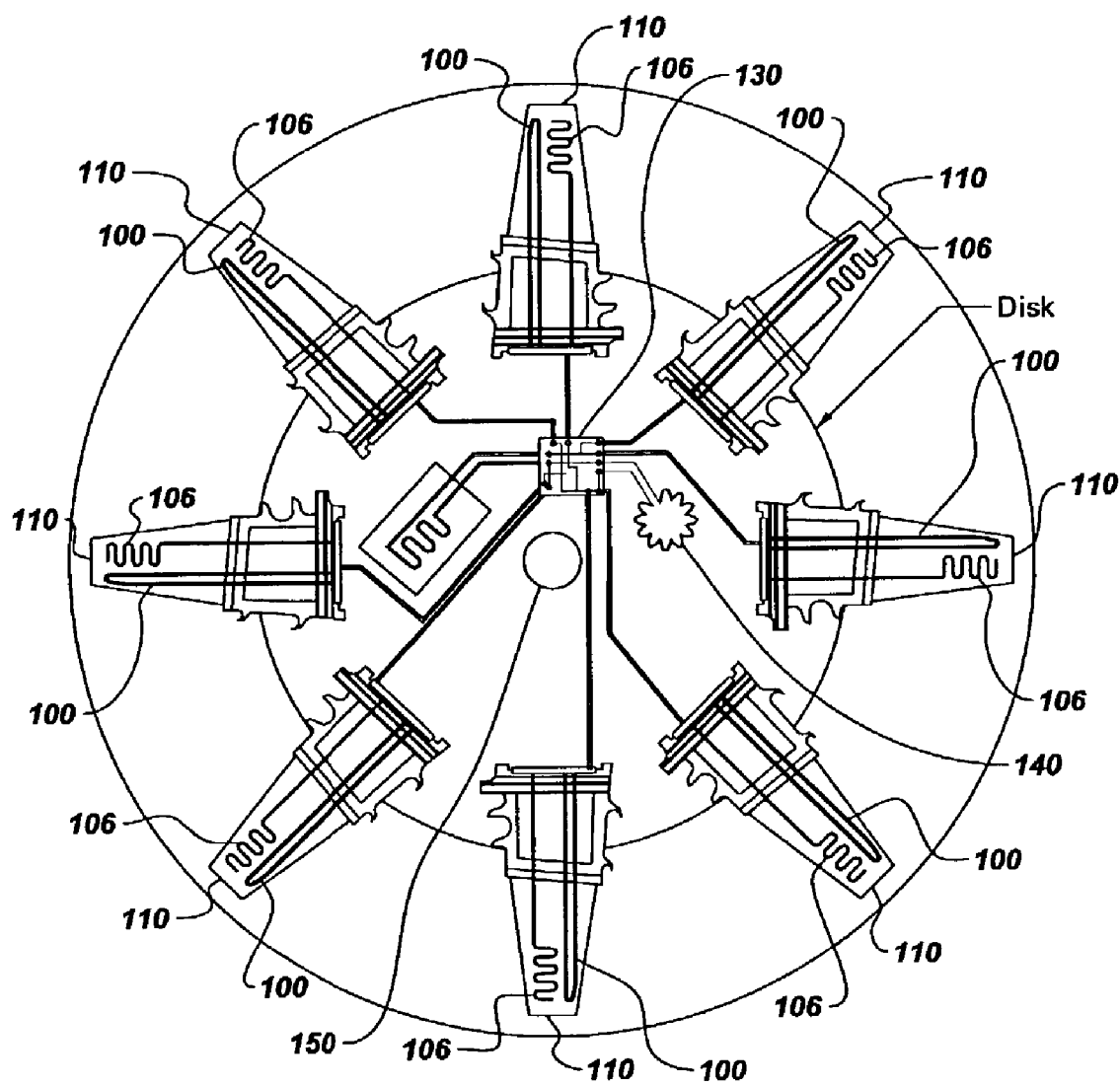
FIG. 7 shows schematically a system for determining temperatures of turbine blades and transmitting data to a remote user.

FIG. 7 is a schematic diagram of an embodiment wherein thermocouple assemblages of the present invention are used to monitor turbine blades of a gas turbine engine. Although FIG. 7 illustrates the application of the present invention to monitoring turbine blades, the condition of other turbine engine components also can be monitored with a similar system. Thermocouple assemblages 100 are disposed on the superalloy substrate of turbine blades 110 and electrically coupled to a measurement center 130. In addition, one or more other devices 106 may be disposed on turbine blades 110 to measure other conditions thereof. For example, device 106 may be a film strain sensor deposited on thermal barrier coating and/or the superalloy substrate to measure the magnitude of the expansion of thermal barrier coating and/or the superalloy substrate. Such disposition of strain sensors also can provide information on any irreversible strain of the thermal barrier coating and/or the superalloy substrate. Film strain sensors 106 may be fabricated using the method described above for film thermocouples. In this case, a change in the resistance of a film of a metallic material is typically measured to determine the magnitude of the strain exhibited by the component to which the film adheres. Thus, a means for measuring the change in the property of the film of the metallic material (electrically conducting material) in this case can be, for example, a meter for measuring electrical resistance (popularly known as an ohmmeter). A communication link 140 is disposed to transmit the temperature measurement made by thermocouple assemblages 100 to a remote user. A thermoelectric generator 150 provides power to operate measurement center 130 and communication link 140. Communication link 140 may be hard-wired or wireless telecommunication links that can be, but are not limited to, telephone lines with associated modems, radio frequency, microwave, satellite transmission, or combinations thereof. Thus, a remote user at a central station can simultaneously monitor the conditions of components of multiple turbine engines. Using wireless communication links, the user can monitor turbine engines that are not at fixed locations, such as those of airplanes. The central station can include devices for receiving signals transmitted from the remote turbines, converting signals to data, analyzing, presenting data, generating reports, etc. Such a central station can include one or more digital computers to perform these functions.

In one embodiment, at least a part or all of the circuitry associated with the operation of the measurement and data communication is formed on the engine part by the method comprising direct writing and annealing or sintering, as is disclosed above.

EXAMPLE

The manufacture of a Pt/Pt—Rh film thermocouple is described in the immediately following paragraph.

Figure 8:
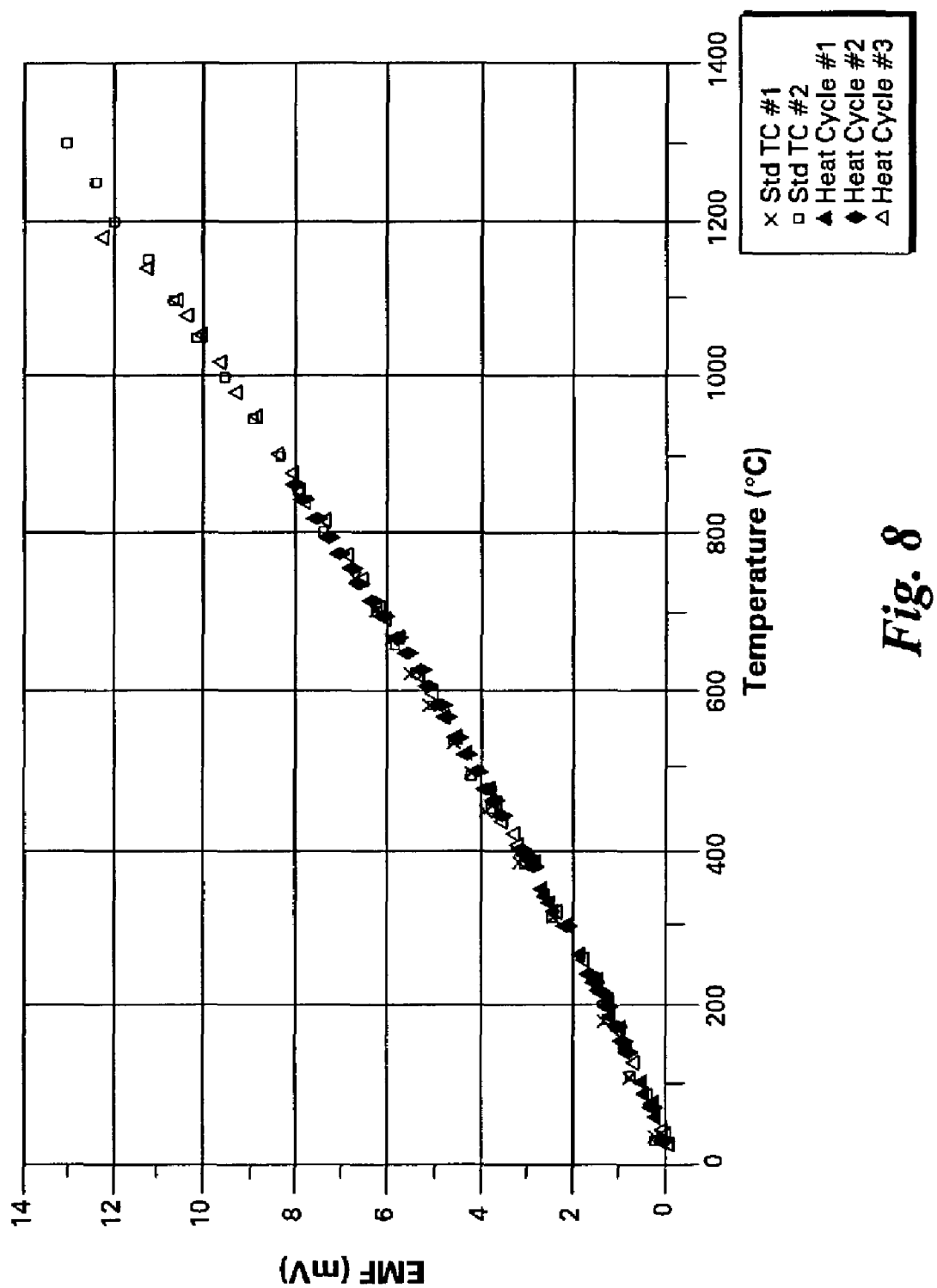
FIG. 8 compares the emf of a Pt/Pt-10% Rh film thermocouple of the present invention in several heating/cooling cycles to that of standard Pt/Pt-10% Rh thermocouples.

A Pt/Pt-10% Rh film thermocouple was formed on an yttria-stabilized zirconia dielectric film by the direct writing method as disclosed above. An yttria-stabilized zirconia dielectric film having a thickness of about 180 micrometers was first deposited on a Ni alloy substrate. Narrow films of Pt and Pt-10% Rh having a thickness of about 50 micrometers and joining at one end to form a junction were deposited on the yttria-stabilized zirconia dielectric film. The entire piece was dried and then heat treated in vacuum at about 1225° C. for about 2 hours to densify the films. After heat treating, the joined Pt and Pt-10% Rh form a film thermocouple. The Ni alloy piece with the yttria-stabilized dielectric film and the film thermocouple was heated and cooled down in three heating/cooling cycles. The final temperatures reached during the three heating steps were about 400° C., about 850° C., and about 1200° C., respectively. The EMFs of the film thermocouple and two other standard Pt/Pt-10% Rh thermocouples, the junctions of which were located adjacent to that of the film thermocouple, were measured as a function of temperature and shown in FIG. 8. The film thermocouple of the present invention accurately followed the EMF-temperature curves of the two standard thermocouples. A visual inspection of the film thermocouple at the end of the third heating/cooling cycle revealed that the film thermocouple still adhered to the underlying yttria-stabilized zirconia film.

While various embodiments are described herein, it will be appreciated from the specification that various combinations of elements, variations, equivalents, or improvements therein may be made by those skilled in the art, and are still within the scope of the invention as defined in the appended claims.

The invention claimed is:

1. A system for measuring a condition of a turbine engine component, said condition being selected from the group consisting of strain and combination of temperature and strain of said component, said system comprising:
   a first electrically non-conducting film comprising a material selected from the group consisting of dielectric materials and electrically insulating materials, said first film being disposed on a substrate of said turbine engine component without a removal of a substrate material to compensate for a thickness of said first electrically non-conducting film; and
   at least a film of an electrically conducting material disposed on said first electrically non-conducting film wherein a change in a property of said at least a film of said electrically conducting material is measured, said change in said property relating to said condition of said turbine engine component, said property being electrical resistance of said film of said electrically conducting material when said condition is strain, and said property being electromotive force developed in said film of said electrically conducting material when said condition includes temperature;
   wherein said first electrically non-conducting film comprises a material that has a thermal expansion coefficient selected such that said electrically non-conducting film and said at least a film of said electrically conducting material remain adhered to films and substrates adjacent thereto through at least a cycle of extreme operating temperature, and wherein a thermal strain between said first electrically non-conducting film and said substrate is maintained at less than about 0.006.

2. The system according to claim 1 further comprising a second electrically non-conducting film disposed on said first electrically non-conducting film and said at least a film of an electrically conducting material, wherein said second electrically non-conducting film comprises a material that has a thermal expansion coefficient selected such that said electrically non-conducting films and said at least a film of said electrically conducting material remain adhered to films adjacent thereto through at least a cycle of extreme operating temperature.

3. A system for measuring a condition of a turbine engine component, said condition being selected from the group consisting of strain and combination of strain and temperature, said system comprising:
   a first electrically non-conducting film comprising a material selected from the group consisting of dielectric materials and electrically insulating materials, said first film being disposed on a substrate of said turbine engine component without a removal of a substrate material to compensate for a thickness of said first electrically non-conducting film; and
   at least a film of an electrically conducting material disposed on said first electrically non-conducting film wherein a change in a property of said at least a film of said electrically conducting material is measured, said change in said property relating to said condition of said turbine engine component, said property being electrical resistance of said film of said electrically conducting material when said condition is strain, and said property being electromotive force developed in said film of said electrically conducting material when said condition includes temperature;

wherein said at least a film of an electrically conducting material extends beyond an edge of said first electrically non-conducting film to form a thermocouple junction with said substrate.

4. A turbine engine component having a condition selected from the group consisting of strain and a combination of temperature and strain, said turbine engine component comprising:
   a substrate;
   a first electrically non-conducting film comprising a material selected from the group consisting of dielectric materials and electrically insulating materials, said first electrically non-conducting film being disposed on a substrate of said turbine engine component without a removal of a substrate material to compensate for a thickness of said first electrically non-conducting film; and
   at least a film of an electrically conducting material disposed on said first electrically non-conducting film, wherein a change in a property of said film is measured, said change relating to said condition, said property being electrical resistance of said film when said condition is strain, and said property being electromotive force developed in said film when said condition includes temperature, wherein a thermal strain between said first electrically non-conducting film and said substrate is maintained at less than 0.006.

5. The turbine engine component of claim 4 further comprising a second electrically non-conducting film disposed on said first electrically non-conducting material and said at least a film of an electrically conducting material, wherein said second electrically non-conducting film comprises a material that has a thermal expansion coefficient selected such that said first and second electrically non-conducting films and said at least a film of said electrically conducting material remain adhered to films adjacent thereto through at least a cycle of extreme operating temperature.

6. A method for making a system for measuring a condition of a turbine engine component, said condition being selected from the group consisting of temperature, strain, and combination thereof, said method comprising:
   depositing a first electrically non-conducting film on a substrate of said turbine engine component without removing a substrate material to compensate for a thickness of said first electrically non-conducting film, said first electrically non-conducting film comprising a material selected from the group consisting of dielectric materials and electrically insulating materials; and
   depositing at least a film of an electrically conducting material on said first electrically non-conducting film, wherein a change in a property of said at least a film of said electrically conducting material is capable of being measured, said change in said property relating to said condition of said turbine engine component, said property being electrical resistance of said film of said electrically conducting material when said condition is strain, and said property being electromotive force developed in said film of said electrically conducting material when said condition includes temperature;

wherein a thermal strain between said first electrically non-conducting film and said substrate is maintained at less than 0.006.

7. The method of claim 6 further comprising depositing a second electrically non-conducting film on said first dielectric material and said at least a film of an electrically conducting material to sandwich said electrically conducting material between said first and second electrically non-conducting films, wherein said second electrically nonconducting film comprises a material that has a thermal expansion coefficient selected such that said first and second electrically non-conducting films and said at least a film of said electrically conducting material remain adhered to films adjacent thereto through at least a cycle of extreme operating temperature.

8. The method according to claim 6 for making a system for determining a condition of a turbine engine component; wherein each of said steps of depositing comprises delivering a mixture, which comprises a powder dispersed in a liquid medium, at a substantially constant rate through a nozzle onto a surface, said nozzle has an orifice from about 10 nm to about 250 micrometers, and said nozzle is spaced apart from said surface at a substantially constant distance.

9. The method according to claim 8, further comprising heat treating a film after depositing said film and before depositing an adjacent film.

10. The method according to claim 9, wherein said heat treating comprises locally heating with a beam of energy selected from laser and electron heating.

11. The method according to claim 9, wherein said heat treating comprises annealing in a furnace.

12. The method according to claim 6, wherein said depositing at least a film of an electrically conducting material on said first electrically non-conducting film comprises depositing two spaced-apart films of different electrically conducting materials such that said space-apart films join at one end to form a thermocouple junction.

13. The method according to claim 6, further comprising depositing a third electrically non-conducting material between said two spaced-apart films of electrically conducting materials.

14. A method for determining a condition of a turbine engine component, said condition being selected from the group consisting of strain and a combination of temperature and strain, said method comprising:
   providing a system on a surface of said turbine engine component for measuring said condition, said system comprising at least a film of an electrically conducting material disposed on an electrically non-conducting film, wherein said step of providing comprises selecting said electrically non-conducting material such that a thermal strain between said electrically non-conducting film and material of said turbine engine component is maintained at less than 0.006;
   measuring a change in a property of said at least a film of said electrically conducting material, wherein said property is electrical resistance of said film when said condition is strain, and wherein said property is electromotive force developed in said film when said condition includes temperature; and
   relating said change in said property to said condition of said turbine engine component.

15. A method for measuring a condition of a turbine engine component, said condition being selected from the group consisting of strain and a combination of temperature and strain, said method comprising:
   providing a system on a surface of said turbine engine component for measuring said condition, said system comprising at least a film of an electrically conducting material disposed on an electrically non-conducting film, wherein said step of providing comprises selecting said electrically non-conducting material such that a thermal strain between said electrically non-conducting film and material of said turbine engine component is maintained at less than 0.006;

measuring a change in a property of said at least a film of said electrically conducting material, wherein said property is electrical resistance of said film when said condition is strain, and wherein said property is electromotive force developed in said film when said condition includes temperature;

relating said measurements on said change in said property to said condition of said turbine engine component; and transmitting said condition to a remote data collection station through a communication link.

16. The method according to claim 15, wherein said communication link is selected from the group consisting of telephone lines with associated modems, radio frequency transmission, microwave transmission, satellite transmission, and combinations thereof.

17. The method according to claim 16, further comprising:

monitoring said condition;

detecting a condition that is outside a predetermined limit; and performing maintenance on said turbine engine component.

* * * * *